United States Patent
Ma et al.

(10) Patent No.: US 11,215,874 B2
(45) Date of Patent: Jan. 4, 2022

(54) LIGHT COLLIMATION DEVICE, BACKLIGHT MODULE AND DISPLAY PANEL

(71) Applicant: BOE Technology Group Co., Ltd., Beijing (CN)

(72) Inventors: Sen Ma, Beijing (CN); Qian Wang, Beijing (CN); Tao Hong, Beijing (CN); Wenqing Zhao, Beijing (CN); Qingxun Zhang, Beijing (CN); Zhongxiao Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/196,975

(22) Filed: Mar. 9, 2021

(65) Prior Publication Data
US 2021/0302786 A1 Sep. 30, 2021

(30) Foreign Application Priority Data

Mar. 25, 2020 (CN) .......................... 202010219768.3

(51) Int. Cl.
*G02F 1/00* (2006.01)
*G02F 1/13357* (2006.01)
(Continued)

(52) U.S. Cl.
CPC ..... *G02F 1/133605* (2013.01); *G02B 6/0031* (2013.01); *G02F 1/133607* (2021.01)

(58) Field of Classification Search
CPC .. G02B 6/0031; G02B 6/0026; G02B 6/0053; G02F 1/133602
See application file for complete search history.

(56) References Cited

U.S. PATENT DOCUMENTS

| 5,363,294 A | 11/1994 | Yamamoto et al. |
| 9,557,466 B2 * | 1/2017 | Fattal .................. G02B 6/0068 |

(Continued)

FOREIGN PATENT DOCUMENTS

| CN | 104456311 A | 3/2015 |
| CN | 108646338 A | 10/2018 |

(Continued)

OTHER PUBLICATIONS

Office Action dated Aug. 26, 2021 for Chinese Patent Application No. 202010219768.3 and English Translation.

*Primary Examiner* — Gerald J Sufleta, II
(74) *Attorney, Agent, or Firm* — Ling Wu; Stephen Yang; Ling and Yang Intellectual Property (57) ABSTRACT

A light collimation device, a backlight module and a display panel are provided. The light collimation device includes a lampshade and a light guiding part, wherein the lampshade includes a plurality of curved reflecting parts, a first total reflecting part and a second total reflecting part. The curved reflecting part is configured to reflect part of light from a light source arranged at a focal point of curved reflecting part to the first total reflecting part. The first total reflecting part is configured to reflect part of incident light to the second total reflecting part and directly direct another part of light to the light guiding part. The second total reflecting part is configured to reflect incident light to the light guiding part. The light guiding part is configured to cause incident light to propagate in a total reflection.

18 Claims, 4 Drawing Sheets

(51) Int. Cl.
*G02F 1/1335* (2006.01)
*F21V 8/00* (2006.01)

(56) References Cited

U.S. PATENT DOCUMENTS

| | | | | |
|---|---|---|---|---|
| 2006/0203486 A1* | 9/2006 | Lee | .................. | G02B 6/0018 |
| | | | | 362/244 |
| 2011/0109840 A1* | 5/2011 | Masuda | ............... | G02B 6/0021 |
| | | | | 349/62 |
| 2016/0018582 A1* | 1/2016 | Fiorentino | ............. | G02B 6/002 |
| | | | | 362/609 |
| 2016/0033705 A1* | 2/2016 | Fattal | ................... | G02B 5/1866 |
| | | | | 349/15 |
| 2016/0341874 A1 | 11/2016 | Fan | | |
| 2018/0024289 A1* | 1/2018 | Fattal | ................... | G02B 6/0038 |
| | | | | 362/601 |
| 2020/0132907 A1 | 4/2020 | Tan | | |
| 2020/0371279 A1 | 11/2020 | Meng et al. | | |

FOREIGN PATENT DOCUMENTS

| | | | |
|---|---|---|---|
| CN | 108089253 B | | 6/2019 |
| CN | 110389469 A | | 10/2019 |
| CN | 110673388 A | | 1/2020 |
| TW | I323818 B | | 4/2010 |

\* cited by examiner

LIGHT COLLIMATION DEVICE, BACKLIGHT MODULE AND DISPLAY PANEL

CROSS-REFERENCE TO RELATED APPLICATION

The present application claims the priority of Chinese Patent Application No. 202010219768.3 filed to the CNIPA on Mar. 25, 2020, the content of which is hereby incorporated by reference.

TECHNICAL FIELD

Embodiments of the present disclosure relate to, but are not limited to, a light collimation device, a backlight module and a display panel.

BACKGROUND

With the development of display devices, more and more attention has been paid to the light-emitting utilization rate of displays. At present, the light-emitting angle of the display is large, only a small amount of light can be received by human eyes, and the light-emitting utilization rate is low. In addition, when browsing some confidential contents, users don't want the viewing angle range of the display to be too large, and a peep-proof display is expected.

SUMMARY

The following is a summary of the subject matter described in detail herein. The summary is not intended to limit the protection scope of the claims.

In a first aspect, a light collimation device is provided, which includes a lampshade and a light guiding part, wherein the lampshade is arranged at one end of the light guiding part and includes a plurality of curved reflecting parts, a first total reflecting part and a second total reflecting part.

The curved reflecting part is configured to reflect light from a light source arranged at a focal point of the curved reflecting part to the first total reflecting part.

The first total reflecting part is configured to reflect part of light incident on the first total reflecting part to the second total reflecting part and directly direct another part of the light to the light guiding part.

The second total reflecting part is configured to reflect light incident on the second total reflecting part to the light guiding part.

The light guiding part is configured to cause the light incident on the light guiding part to propagate in total reflection.

In some embodiments, the curved reflecting part, the first total reflecting part and the second total reflecting part are adjacent in sequence, the first total reflecting part is adjacent to the light source and located between the light source and the curved reflecting part, a reflective surface of the first total reflecting part is a flat surface.

In some embodiments, light emitted by the light source includes a first edge light far away from the light guiding part and a second edge light close to the light guiding part. The edge light refers to light emitted by the light source with a maximum divergence angle after incident on the lampshade. The first edge light is incident outside of the reflecting surface of the curved reflecting part after reflected through the curved reflecting part and the first total reflecting part.

In some embodiments, the reflective surface of the second total reflecting part is a flat surface. An included angle $\gamma$ is formed between the reflective surface of the first total reflecting part and the reflective surface of the second total reflecting part. $\gamma=180°-\beta-\theta_1$, $n \sin \theta_1 = n' \sin \theta$, $\beta$ is an included angle of light incident on the first total reflecting part from the curved reflecting part and the reflective surface of the first total reflecting part, $\theta$ is an incident angle incident on the light guiding part from the second total reflecting part, n is a refractive index of the lampshade, and n' is a refractive index of the light guiding part.

In some embodiments, amount of light incident on the light guiding part from the first total reflecting part and the second total reflecting part is equal.

In an exemplary embodiment, a distance from an intersection of the first total reflecting part and the second total reflecting part to an intersection of the second total reflecting part and the light guiding part is called a length of the second total reflecting part, and the length satisfies: light incident on the first total reflecting part from the curved reflecting part are all incident on the light guiding part directly or through the second total reflecting part.

In a second aspect, a backlight module is provided, which includes a light collimation device provided by the embodiment of the present disclosure and multiple light sources, wherein the multiple light sources are respectively arranged at focal points of curved reflecting parts of the lampshade.

In a third aspect, a display panel is provided, which includes a backlight module provided by the embodiment of the disclosure, and a light extraction structure, a liquid crystal layer, an orientation structure and a light absorption layer which are sequentially arranged on a light guiding part.

The light extraction structure is configured to extract light with collimation from the light guiding part and incident on the liquid crystal layer.

The orientation structure is configured to reflect part of the light incident on the liquid crystal layer, and the orientation structure includes reflection slopes arranged at intervals on a side surface of the light absorption layer close to the liquid crystal layer. In some embodiments, the light extraction structure includes alternately arranged blocking parts and light extraction openings, and sizes of the light extraction openings gradually increase along a propagation direction of light in the light guiding part.

In an exemplary embodiment, one light extraction opening corresponds to one reflection slope.

In some embodiments, when the width of the light extraction opening is larger than the preset upper limit value, the light extraction opening is divided into a plurality of sub-light extraction openings arranged at intervals, and the width of the sub-light extraction openings is not larger than the preset upper limit value.

In some embodiments, the preset upper limit value is the width of the maximum light extraction opening where the incident position of light entering the light absorption layer through the light extraction opening does not overlap when the liquid crystal layer takes the maximum refractive index and the minimum refractive index.

In an exemplary embodiment, one sub-light extraction opening corresponds to one reflection slope.

In an exemplary embodiment, the display panel includes multiple pixel units, and each pixel unit includes one light extraction opening.

Other aspects will become apparent upon reading and understanding accompanying drawings and the detailed description.

BRIEF DESCRIPTION OF DRAWINGS

Other features, objects and advantages of the present disclosure will become more apparent by reading the detailed description of non-limiting embodiments made with reference to the following drawings.

DETAILED DESCRIPTION

The following is a further detailed description of the present disclosure with reference to drawings and embodiments. It may be understood that the specific embodiments described here are only used to explain the relevant technical solutions, but not to limit the technical solutions. In addition, for convenience of description, only the parts related to the invention are shown in the drawings.

The embodiments in the present disclosure and features in the embodiments can be combined with each other arbitrarily if there is no conflict. Hereinafter, the present disclosure will be described in detail with reference to the drawings and in combination with embodiments.

Referring to FIG. 1 to FIG. 4, a light collimation device may include a lampshade 10 and a light guiding part 21, wherein the lampshade 10 is arranged at one end of the light guiding part 21, and the lampshade 10 may include a curved reflecting part 11, a first total reflecting part 12 and a second total reflecting part 13.

Figure 1:
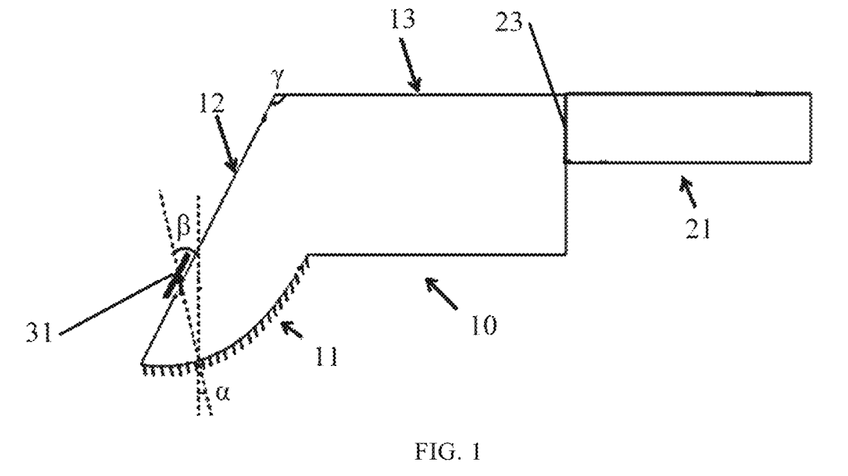
FIG. 1 shows an exemplary structural block diagram of a light collimation device according to an embodiment of the present disclosure.

The curved reflecting part 11 is configured to reflect light from a light source 31 arranged at a focal point of the curved reflecting part 11 to the first total reflecting part 12.

The first total reflecting part 12 is configured to reflect part of the light incident on the first total reflecting part 12 to the second total reflecting part 13, and direct another part of the light to the light guiding part 21 directly.

The second total reflecting part 13 is configured to reflect light incident on the second total reflecting part 13 to the light guiding part 21.

The light guiding part 21 is configured to allow the light incident on the light guiding part 21 to propagate in total reflection, wherein the light incident by the first total reflecting part 12 and the second total reflecting part 13 are located on both sides of a plane 22 of a surface of the light guiding part 21 which is near a curved reflecting part 11.

The curved reflecting part 11 includes a reflecting surface, the first total reflecting part 12 includes a reflecting surface and the second total reflecting part 13 includes a reflecting surface.

In an exemplary embodiment, the curved reflecting part 11 may be a parabolic mirror or other curved surfaces with collimation function.

In an exemplary embodiment, the material of the curved reflecting part 11 may include resin, such as polymethylmethacrylate.

In an exemplary embodiment, the light guiding part 21 may include a first surface and a second surface which are oppositely arranged, and the first surface and the second surface herein may be arranged in parallel. It should be understood that besides the first surface and the second surface, the light guiding part 21 may also include other surfaces, such as a light incident surface 23 adjacent to the curved reflecting part 11.

Figure 2:
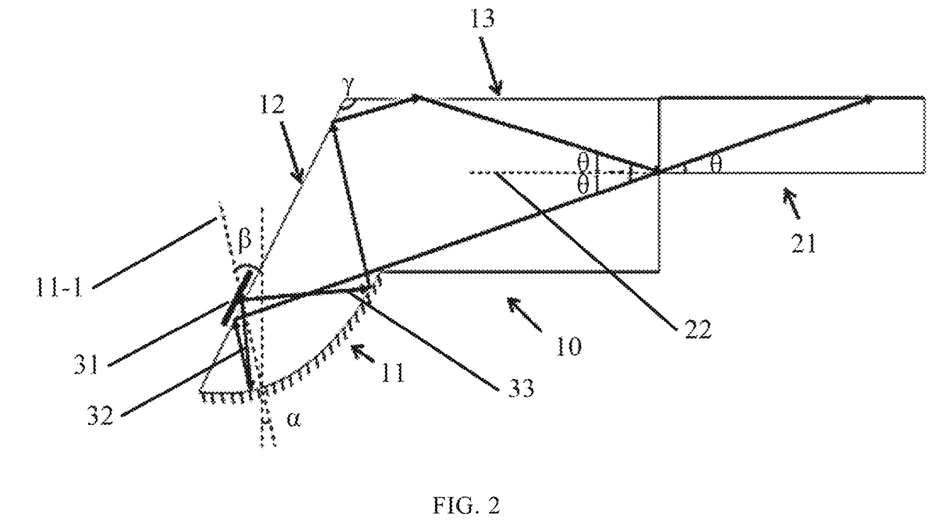
FIG. 2 shows a schematic diagram of a light path in the light collimation device of FIG. 1.
Figure 3:
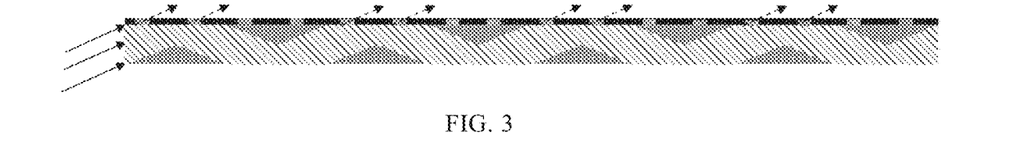
FIG. 3 shows a schematic diagram of partial light path in a light guiding part according to an embodiment of the present disclosure.
Figure 4:
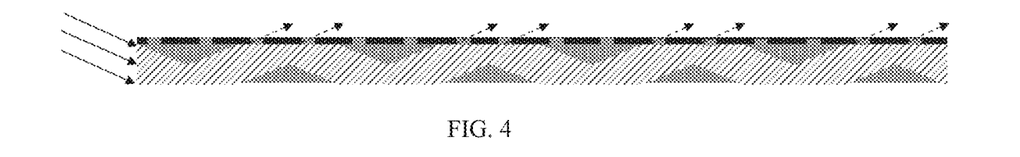
FIG. 4 shows a schematic diagram of another partial light path in a light guiding part according to the embodiment of the present disclosure.

FIG. 2 is a schematic diagram of a light path, and FIG. 2 illustrates the light path with the curved reflecting part 11 as a parabolic mirror. The light emitted by the light source 31 is collimated after being incident on the curved reflecting part 11, and a direction of the collimated light is parallel to a paraboloid symmetry axis 11-1. Collimated light is incident on the first total reflecting part 12 and a total reflection occurs, wherein part of light (such as light 32) is directly coupled into the light guiding part 21, while another part of light (such as light 33) is reflected by the second total reflecting part 13 and then coupled into the light guiding part 21. Two groups of light are on both sides of the plane 22 with the same incident angle $\theta_1$. Propagation paths in the light guiding part 21 of the two groups of light are complementary, so that light distribution in the light guiding part 21 is closely contacted, thus preventing an area without light and increasing utilization rate of the light. FIG. 3 and FIG. 4 respectively show propagation paths of the two groups of light in the light guiding part 21.

In an exemplary embodiment, material of the lampshade 10 may include transparent materials such as resin or glass.

In an exemplary embodiment, the lampshade 10 may be processed by processes such as injection molding, turning, etc.

In an exemplary embodiment, a paraboloid outer surface of the curved reflecting part 11 may be coated with a high reflectivity film, such as silver plating, aluminum plating, etc.

In an exemplary embodiment, the surfaces of the first total reflecting part 12 and the second total reflecting part 13 may not be coated.

In an exemplary embodiment, the light source 31 may be a Light Emitting Diode (LED), an Organic Light Emitting Diode (OLED), a micro LED, etc.

In an exemplary embodiment, the light source 31 may be monochromatic light.

In some embodiments, the curved reflecting part 11, the first total reflecting part 12 and the second total reflecting part 13 are adjacent in sequence, wherein the first total reflecting part 12 is adjacent to the above-mentioned light source 31 and located between the light source 31 and the curved reflecting part 11. A reflective surface of the first total reflecting part 12 may be a flat surface, and an included angle β is formed between a symmetry axis 11-1 of the reflective surface of the curved reflecting part 11 and the reflective surface of the first total reflecting part 12, causing at least a part of light incident on the first total reflecting part 12 to be reflected totally when the light source 31 emits light.

Figure 5:
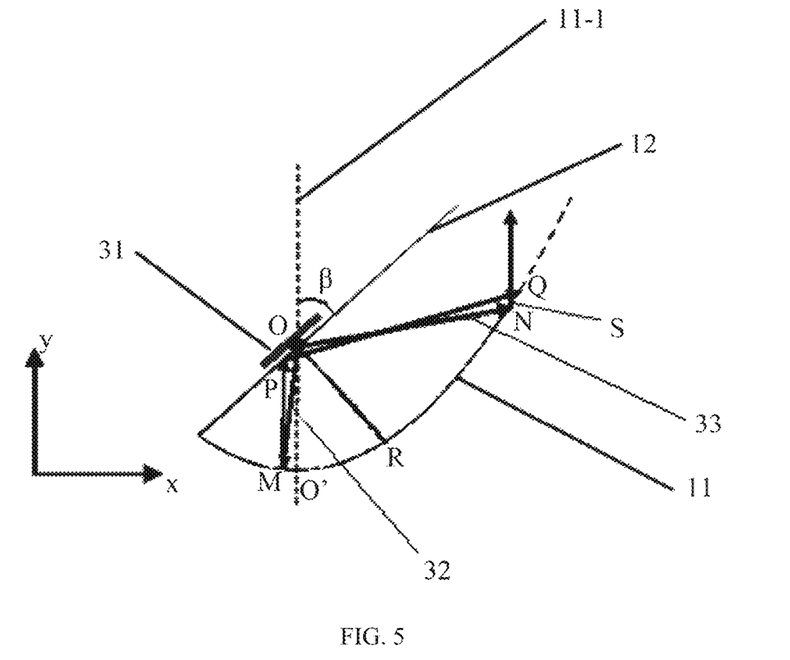
FIG. 5 shows a structural schematic diagram of a curved reflecting part and a first total reflecting part of FIG. 1.

As shown in FIG. 5, for convenience of description, a symmetry axis OO' of the curved reflecting part 11 is set in a y-axis direction. A vertex O' of the paraboloid is set as an origin of coordinates, a point O is set as a focal point of the paraboloid, and a refractive index of the lampshade 10 is n. At this time, in order to make the light collimated by the curved reflecting part 11 incident on the first total reflecting part 12 and to be reflected totally by the first total reflecting part 12 when the light source 31 emits light, an incident angle of the collimated light incident on the first total reflecting part 12, i.e., 90-β, is larger than a critical angle of total reflection arcsin(1/n). That is, the angle β satisfies the following conditions:

$$90\beta > \arcsin(1/n), \quad \text{formula 1}$$

n is the refractive index of the lampshade 10 and arcsin(1/n) is the critical angle of total reflection.

In an exemplary embodiment, a larger angle β satisfying the above conditions is obtained, so that the light after being incident on the lampshade 10 from the light source 31 is distributed near the symmetry axis OO', and energy distribution of the collimated light is more uniform and dense. When such collimated light is coupled into the light guiding part 21, the light coupling efficiency may be improved.

In some embodiments, the light emitted by the light source 31 includes a first edge light 32 far away from the light guiding part 21 and a second edge light 33 close to the light guiding part 21. The edge light refers to the light emitted by the light source with a maximum divergence angle after being incident on the lampshade 10. A position where the first edge light 32 is incident on an extension line of the reflecting surface of the curved reflecting part 11 (i.e., the paraboloid of the curved reflecting part 11) through the curved reflecting part 11 and the first total reflecting part 12 in turn is called a first position Q. A position where the second edge light 33 is incident on the reflecting surface of the curved reflecting part 11 from the light source 31 is called a second position N.

An end S of the curved reflecting part 11 close to the light guiding part 21 is located between the first position Q and the second position N.

Referring to FIG. 5, light OM and light ON are two edge lights. The light OM is incident on the curved reflecting part 11 at point M, and is incident on a point P of the first total reflecting part 12 after being reflected by the curved reflecting part 11, and then is total reflected and intersects with the extension line of the curved reflecting part 11 at point Q (That is, point Q is outside of the curved reflecting part). The extension line of the curved reflecting part 11 is marked with dashed lines in FIG. 5. The light ON is incident on the curved reflecting part 11 at point N. At this time, in order to prevent the collimated light reflected by the first total reflecting part 12 from being incident on the curved reflecting part 11 for the second time to form stray light, point Q is higher than point N, that is, y coordinate of point Q is larger than y coordinate of point N. The end S of the reflecting surface of the curved reflecting part 11 close to the light guiding part 21 is between point Q and point N.

In some embodiments, the reflective surface of the second total reflecting part 13 is a flat surface, and an included angle γ is formed between the reflective surface of the first total reflecting part 12 and the reflective surface of the second total reflecting part 13. The incident angle of light from the second total reflecting part 13 to the light guiding part 21 is adjusted by adjusting the included angle γ.

The included angle γ satisfies the following formula.

Figure 6:
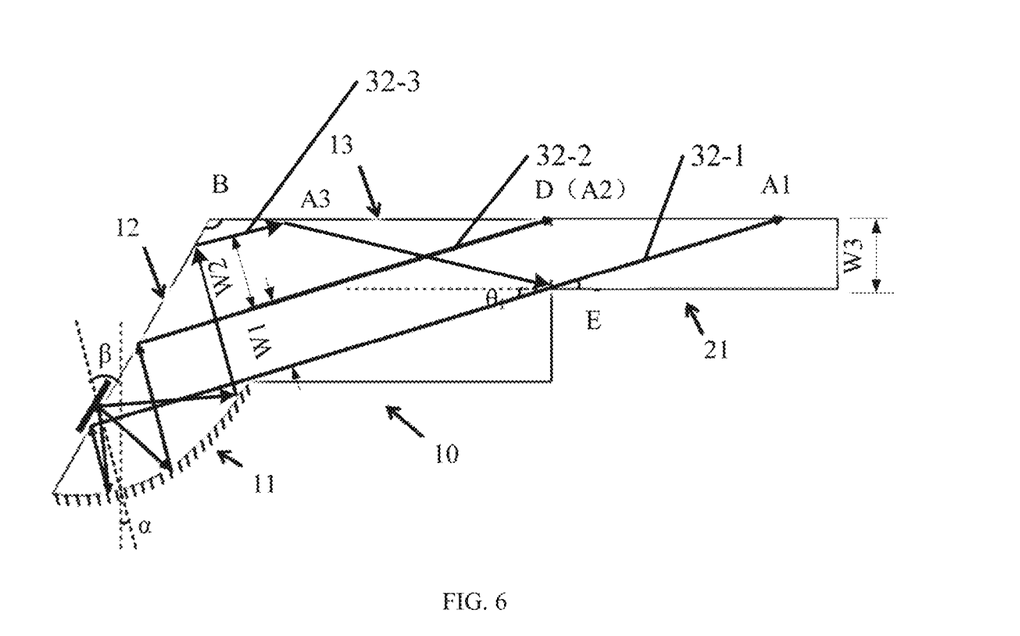
FIG. 6 shows a diagram of a light path of a light collimation device without a light guiding part.
Figure 7:
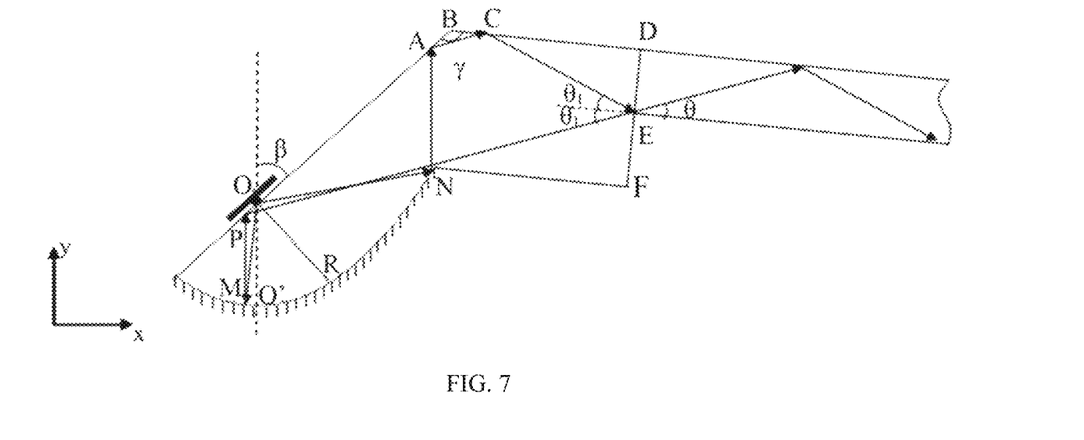
FIG. 7 shows a schematic diagram of a light collimation device with a symmetry axis of a curved reflecting part as y axis.

As shown in FIG. 6 and FIG. 7, as the included angle γ between the reflecting surface of the first total reflecting part 12 and the reflecting surface of the second total reflecting part 13 changes, the incident angle at which the light incident on the light guiding part 21 from the second total reflecting part 13 will change. Therefore, by adjusting the angle γ, a required incident angle to the light guiding part 21 may be obtained. If the collimated light is set to propagate in a total reflection in the light guiding part 21 at an angle θ, then an incident angle $\theta_1$ of the collimated light reflected by the second total reflecting part 13 onto the light guiding part 21 satisfies n sin $\theta_1$ = n' sin θ, wherein n is the refractive index of the lampshade 10 and n' is the refractive index of the light guiding part 21. According to a geometric relationship, $\theta_1 = \angle BCA$. In addition, the included angle between the first total reflecting part 12 and the paraboloid symmetry axis oo' is β, and at this time, the light NA after reflected by the first total reflecting part 12 has $\angle BAC = \beta$, then:

$$\gamma = 180° - \beta - \theta_1$$

The angle $\theta_1$ is determined by the following formula: n sin $\theta_1$ = n' sin θ

The angle θ is the incident angle incident on the light guiding part 21, n is the refractive index of the lampshade 10, and n' is the refractive index of the light guiding part 21.

The light incident on the light guiding part 21 includes the light from the first total reflecting part 12 and the light from the second total reflecting part 13, and both of the two groups of light are quasi-linear light from the curved reflecting part 11. Therefore, the incident angle of the light from the first total reflecting part 12 incident on the light guiding part 21 is the same as the incident angle of the light of the second total reflecting part 13 incident on the light guiding part 21.

In some embodiments, the distance from the intersection point B of the first total reflecting part 12 and the second total reflecting part 13 to the intersection point D of the second total reflecting part 13 and the light guiding part 21 is called the length BD of the second total reflecting part 13, and the amount of light incident on the light guiding part 21 may be adjusted by adjusting the length BD.

With reference to FIG. 6, a light path diagram of light collimation excluding the light guiding part 21 is given. At this time, part of the light from the first total reflecting part 12 is directly incident on the light guiding part 21, which is called a first group of light, and the other part is incident on the light guiding part 21 after reflected by the second total reflecting part 13, which is called a second group of light. The first group of light is light located between light 32-1 and light 32-2, and the width between the light 32-1 and the light 32-2 is W1, wherein the light 32-1 is the light of the edge light OM from a light source 31 reflected through the first total reflecting part 12. The second group of light is located between the light 32-2 and the light 32-3, and the width between the light 32-2 and the light 32-3 is W2. The light 32-3 is the light of the edge light ON of the light source 31 reflected through the first total reflecting part 12. Intersection points of light 32-1, light 32-2 and light 32-3 with a line BD are A1, A2 and A3 respectively.

It may be seen that the light emitted by the light source 31 is partially collimated into the first group of light and the second group of light, and how to control how much of the first group of light or the second group of light is incident on the light guiding part 21 may be achieved by adjusting the length BD of the second total reflecting part 13. In an exemplary embodiment, the length BD satisfies: light incident on the first total reflecting part from the curved reflecting part is all incident on the light guiding part directly or through the second total reflecting part. For convenience of explanation, the width W1 is set equal to a width W2, that is, A2 is the midpoint between A1 and A3. When end points in the width direction (marked W3) of the light guiding part 21 are located at points A2 and E respectively, that is, when a point D and a point A2 overlap, all the light from the light source 31 are incident on the light guiding part 21.

An implementation example of a light collimation device will be given with reference to FIG. 7 and FIG. 8. Dimensional parameters of the lampshade are as follows: the focal length of the paraboloid of curved reflecting part 11 is 0.75 mm, the included angle β between the of the paraboloid symmetry axis of the curved reflecting part 11 and the reflecting surface of first total reflecting part 12 is 45°, the included angle γ between the reflecting surface of first total reflecting part 12 and the reflecting surface of second total reflecting part 13 is 120°, and the length BD of second total reflecting part 13 is 3.17 mm. The width of the lampshade 10 is 2 mm, as shown in FIG. 9, so one lampshade may provide parallel light with a width D of 2 mm. It may be seen from the light path diagram shown in FIG. 7 that there is no light propagating in a lower left corner of the lampshade 10, so this part may be cut off during processing, and an effect of saving space may be obtained.

Figure 8:
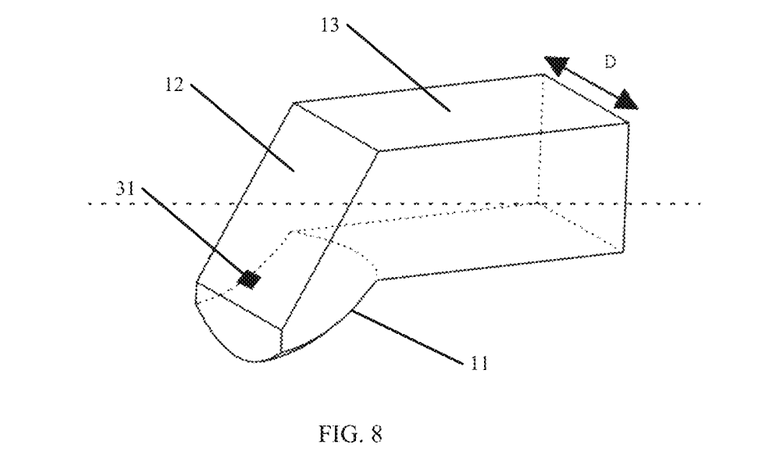
FIG. 8 shows a schematic stereogram of a part of lampshade corresponding to a curved surface of FIG. 1.
Figure 9:
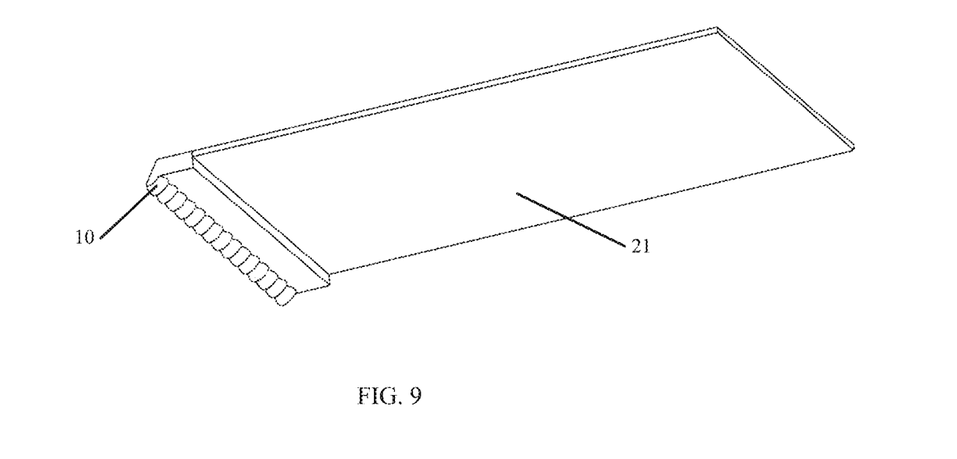
FIG. 9 shows an exemplary structural block diagram of a backlight module according to an embodiment of the present disclosure.

With reference to FIG. 8 and FIG. 9, the embodiment of the present disclosure also provides a backlight module, which may include the light collimation device provided by the embodiment of the present disclosure and multiple light sources 31. The light collimation device may include multiple lampshades 10, wherein the multiple lampshades 10 may be arranged in parallel at one end of the light guiding part 21, and the multiple light sources 31 are respectively arranged at focal points of curved reflecting parts of the multiple lampshades 10. For example, one light source 31 is arranged at the focal point of the curved reflecting part of each lampshade 10.

Figure 10:
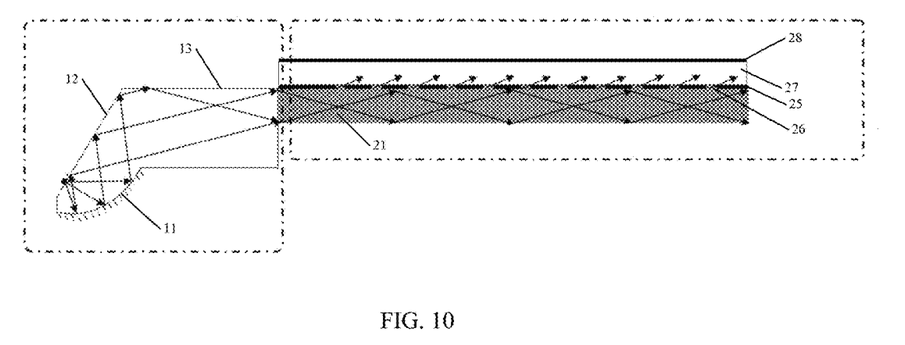
FIG. 10 shows an exemplary structural block diagram of a display panel according to an embodiment of the present disclosure.
Figure 11:
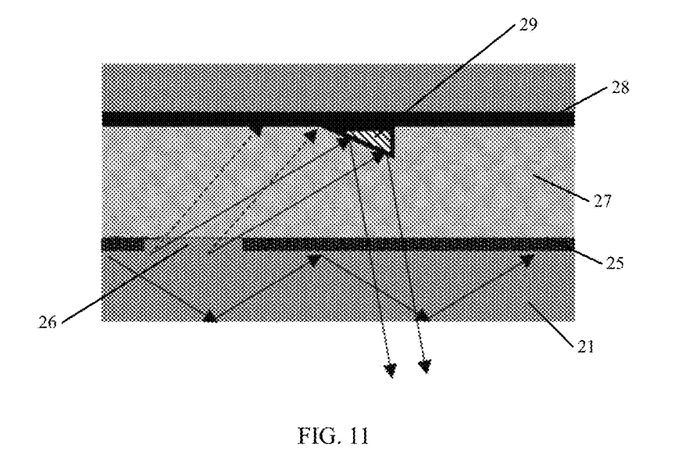
FIG. 11 shows an exemplary structural block diagram of a reflection slope according to an embodiment of the present disclosure.

Referring to FIG. 10 to FIG. 11, an embodiment of the present disclosure also provides a display panel, which may include the backlight module provided by the embodiment of the present disclosure, and a light extraction structure, a liquid crystal layer 27, an orientation structure and a light absorption layer 28 sequentially arranged on the light guiding part 21.

The light extraction structure is configured to extract light from the light guiding part 21 and direct the light to the liquid crystal layer 27.

The orientation structure is configured to reflect part of the light incident on the liquid crystal layer 27, and the orientation structure may include reflection slopes 29 arranged at intervals on a side surface of the light absorbing layer 28 close to the liquid crystal layer 27.

As shown in FIG. 10 and FIG. 11, the light guiding part 21 may be provided with a light extraction structure and a liquid crystal layer 27, wherein the light extraction structure may include alternately arranged light extraction openings 26 and blocking parts 25. In an exemplary embodiment, it may be arranged that each pixel unit has one light extraction opening 26.

In an exemplary embodiment, the blocking part 25 may be made of a material with low refractive index.

Collimated light may be coupled in from the side surface of the light guiding part 21, and propagates in the light guiding part 21 in a total reflection manner. The refractive index value of the light guiding part 21 and the refractive index value of the liquid crystal layer 27 are similar, and light will directly enter the liquid crystal layer 27 when incident on an interface between the light guiding part 21 and the liquid crystal layer 27. Therefore, in order to ensure a total reflection propagation of light in the light guiding part 21, a blocking part 25 is added between the light guiding part 21 and the liquid crystal layer 27. The blocking part 25 may be made of a material with low refractive index, and the difference in refractive index between the light guiding part 21 and the blocking part 25 may cause light to be reflected totally at the interface between the light guiding part 21 and the blocking part 25 when the light source 31 emits light. Etching a light extraction opening 26 with a certain size at the position of each pixel on the blocking part 25 may allow the light extraction opening 26 to be filled with a material with the same refractive index as the light guiding part 21. The light incident on the light extraction opening 26 does not meet a condition of the total reflection, and is directly incident on the liquid crystal layer 27 from the light extraction opening 26. Collimated light propagates through the light guiding part 21, and the light is extracted collimatedly in a direction indicated by an arrow above the light extraction opening 26.

As shown in FIG. 11, a reflection slope 29 is processed on the side surface of the light absorption layer 28 close to the liquid crystal layer 27, and the surface of the reflection slope 29 has high reflectivity. The light extraction openings 26 may be arranged in one-to-one correspondence with the reflection slopes 29. For the convenience of explanation, taken the refractive index of the light guiding part 21 being 1.5, the refractive index of the liquid crystal layer 27 ranging from 1.5 to 1.8, and gray scale ranges being from L0 (a gray scale value is 0) to L255 (a gray scale value is 255) as an example, an explanation is performed. The light enters the liquid crystal layer 27 after emitted from the light extraction opening 26. When the refractive index of the liquid crystal layer 27 is 1.5, the light is not refracted at the interface between the light extraction opening 26 and the liquid crystal layer 27, but is directly incident on the reflection slope 29, then is transmitted through the blocking part 25 and the light guiding part 21 after reflected by the reflection slope 29, and then is emitted, achieving the display of L255 gray scale. See the light path marked by the solid line incident on the reflection slope 29 in FIG. 11. The incident angle of the light incident on the blocking part 25 from the reflection slope 29 is far less than a critical value of the total reflection, so the light incident on the blocking part 25 from the reflection slope 29 is transmitted through the blocking part 25 and the light guiding part 21 and then is emitted. When the refractive index of the liquid crystal layer 27 is adjusted to 1.8, the light is refracted at the interface between the light extraction opening 26 and the liquid crystal layer 27 to change the angle of the light. So that the light is no longer incident on the reflection slope 29, but incident on the light absorbing layer 28 to be absorbed, thus achieving the display of L0 gray scale. See the light path marked by the dashed line incident on the reflection slope 29 in FIG. 11. When the refractive index of the liquid crystal layer 27 is adjusted between 1.5 and 1.8, the refractive angle at the interface between the light extraction opening 26 and the liquid crystal layer 27 changes, part of the light is absorbed by the light absorbing layer 28, and part of the light is incident on the reflection slope 29 and then emitted from the light guiding part 21, thus achieving gray scale modulation between L0 and L255. Therefore, the required directional display may be obtained by optimizing the inclined angle of the reflection slope 29.

In some embodiments, the light extraction structure may include alternately arranged blocking parts 25 and light extraction openings 26, and the size of the light extraction openings 26 may gradually increase along the propagation direction of light in the light guiding part 21. In the process of the total reflection propagation, as the light is emitted from the light extraction openings 26, the energy decreases gradually. The size of the light extraction openings 26 increases in turn along the propagation direction of light, so as to ensure that the emitted energy of each light extraction opening 26 is uniform.

In some embodiments, when the width of the light extraction opening 26 is larger than the preset upper limit value, the light extraction opening 26 is divided into multiple sub-light extraction openings arranged at intervals, wherein the width of the sub-light extraction opening is not larger than the preset upper limit value.

Figure 12:
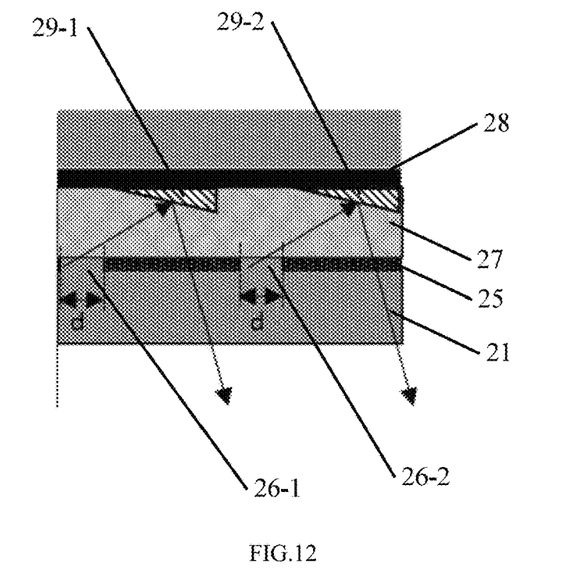
FIG. 12 shows an exemplary structural block diagram of a sub-light extraction opening according to an embodiment of the present disclosure.

In application, when the width of the light extraction opening 26 is larger than the preset upper limit value, the incident positions of light incident on the light absorption layer 28 from the light extraction opening 26 will overlap under the maximum refractive index and the minimum refractive index of the liquid crystal layer 27, which will reduce the display contrast. The preset upper limit value may be the width of the maximum light extraction opening where the incident positions of light incident on the light absorption layer 28 do not overlap when the liquid crystal layer 27 takes the maximum refractive index and the minimum refractive index. Therefore, when the width of the light extraction opening 26 is larger than the preset upper limit value, the light extraction opening 26 may be divided into multiple sub-light extraction openings. As shown in FIG. 12, an example is given in which an light extraction opening 26 with a width larger than the preset upper limit value is split into a sub-light extraction opening 26-1 and a sub-light extraction opening 26-2. In this embodiment, reflection slopes are correspondingly arranged for the sub-light extraction openings, for example, one sub-light extraction opening corresponds to one reflection slope. A reflection slope 29-1 corresponds to the sub-light extraction opening 26-1, and a reflection slope 29-2 corresponds to the sub-light extraction opening 26-2. The width d of the sub-light extraction opening may be half of the width of the original light extraction opening and not more than the preset upper limit value. Here, the number of sub-light extraction openings is not limited, but may be set according to specific applications. The effect of improving the display contrast may be achieved by dividing some light extraction openings whose width is larger than the preset upper limit value into multiple sub-light extraction openings.

The above description is only a description of the preferred embodiments of this disclosure and the applied technical principles. Those skilled in the art should understand that the scope of the invention involved in this disclosure is not limited to the technical scheme formed by the specific combination of the above technical features, but also covers other technical schemes formed by any combination of the above technical features or their equivalent features without departing from the inventive concept. For example, the technical schemes formed by replacing the above features with the technical features with similar functions disclosed in this disclosure (but not limited to).

What we claim is:

1. A light collimation device, comprising:
    a lampshade and a light guiding part, wherein the lampshade is arranged at one end of the light guiding part, and the lampshade comprises a plurality of curved reflecting parts, a first total reflecting part and a second total reflecting part, wherein
    the curved reflecting part is configured to reflect light from a light source arranged at a focal point of the curved reflecting part to the first total reflecting part;
    the first total reflecting part is configured to reflect part of light incident on the first total reflecting part to the second total reflecting part and directly direct another part of light to the light guiding part;
    the second total reflecting part is configured to reflect light incident on the second total reflecting part to the light guiding part; and
    the light guiding part is configured to allow light incident on the light guiding part to propagate in a total reflection.

2. The light collimation device of claim 1, wherein the curved reflecting part, the first total reflecting part and the second total reflecting part are adjacent in sequence, wherein the first total reflecting part is adjacent to the light source and located between the light source and the curved reflecting part, a reflective surface of the first total reflecting part is a flat surface.

3. The light collimation device of claim 1, wherein light emitted by the light source comprises a first edge light far away from the light guiding part and a second edge light close to the light guiding part, wherein the edge light refers to light emitted by the light source with a maximum divergence angle after being incident on the lampshade, the first edge light is incident outside of the reflecting surface of the curved reflecting part after reflected through the curved reflecting part and the first total reflecting part.

4. The light collimation device of claim 1, wherein a reflective surface of the second total reflecting part is a flat surface, an included angle $\gamma$ is formed between a reflective surface of the first total reflecting part and the reflective surface of the second total is reflecting part, $\gamma=180°-\beta\theta_1$, $n \sin \theta_1 = n' \sin \theta$, $\beta$ is an included angle of light incident on the first total reflecting part from the curved reflecting part and the reflective surface of the first total reflecting part, $\theta$ is an incident angle incident on the light guiding part from the second total reflecting part, $n$ is a refractive index of the lampshade, and $n'$ is a refractive index of the light guiding part.

5. The light collimation device of claim 1, wherein a distance from an intersection of the first total reflecting part and the second total reflecting part to an intersection of the second total reflecting part and the light guiding part is called a length of the second total reflecting part, and the length satisfies: light incident on the first total reflecting part from the curved reflecting part are all incident on the light guiding part directly or through the second total reflecting part.

6. The display panel of claim 1, wherein a paraboloid outer surface of the curved reflecting part is coated with a high reflectivity film.

7. A backlight module, comprising:
    the light collimation device of claim 1, and a plurality of light sources, wherein the plurality of light sources are respectively arranged at focal points of curved reflecting parts of the lampshade.

8. The backlight module of claim 7, wherein the curved reflecting part, the first total reflecting part and the second total reflecting part are adjacent in sequence, wherein the first total reflecting part is adjacent to the light source and located between the light source and the curved reflecting part, a reflective surface of the first total reflecting part is a flat surface.

9. The backlight module of claim 7, wherein light emitted by the light source comprises a first edge light away from the light guiding part and a second edge light close to the light guiding part, wherein the edge light refers to light emitted by the light source with a maximum divergence angle after being incident on the lampshade, the first edge light is incident outside of a reflecting surface of the curved reflecting part after reflected sequentially through the curved reflecting part and the first total reflecting part.

10. The backlight module of claim 7, wherein a reflective surface of the second total reflecting part is a flat surface, an included angle $\gamma$ is formed between a reflective surface of the first total reflecting part and a reflective surface of the second total reflecting part, $\gamma=180°-\beta-\theta_1$, $n \sin \theta_1 = n' \sin \theta$, $\beta$ is an included angle of light incident on the first total reflecting part from the curved reflecting part and the reflective surface of the first total reflecting part, $\theta$ is an incident angle of light incident on the light guiding part from the second total reflecting part, n is a refractive index of the lampshade, and n' is a refractive index of the light guiding part.

11. The backlight module of claim 7, wherein a distance from an intersection of the first total reflecting part and the second total reflecting part to an intersection of the second total reflecting part and the light guiding part is called a length of the second total reflecting part, and the length satisfies: light incident on the first total reflecting part from the curved reflecting part are all incident on the light guiding part directly or through the second total reflecting part.

12. A display panel, comprising:
the backlight module of claim 7, and a light extraction structure, a liquid crystal layer, an orientation structure and a light absorption layer sequentially arranged on the light guiding part, wherein
the light extraction structure is configured to extract light with collimation from the light guiding part and incident on the liquid crystal layer; and
the orientation structure is configured to reflect part of light incident on the liquid crystal layer, and the orientation structure comprises reflection slopes arranged at intervals on a side surface of the light absorption layer close to the liquid crystal layer.

13. The display panel of claim 12, wherein the light extraction structure comprises alternately arranged blocking parts and light extraction openings, and sizes of the light extraction openings gradually increase along a propagation direction of light in the light guiding part.

14. The display panel of claim 13, wherein one of the light extraction openings corresponds to one of the reflection slopes.

15. The display panel of claim 13, wherein when a width of the light extraction opening is larger than a preset upper limit value, the light extraction opening is divided into a plurality of sub-light extraction openings arranged at intervals, wherein a width of the sub-light extraction openings is not larger than the preset upper limit value.

16. The display panel of claim 15, wherein one of the sub-light extraction openings corresponds to one of the reflection slopes.

17. The display panel of claim 15, wherein the preset upper limit value is a width of a maximum light extraction opening where incident positions of light incident on the light absorption layer through the light extraction opening do not overlap when the liquid crystal layer takes a maximum refractive index and a minimum refractive index.

18. The display panel of claim 13, wherein the display panel comprises a plurality of pixel units, and each pixel unit comprises one light extraction opening.

* * * * *